United States Patent [19]

Noda et al.

[11] 4,333,111
[45] Jun. 1, 1982

[54] SIGNAL PROCESSING CIRCUIT FOR SOLID-STATE CAMERA

[75] Inventors: Masaru Noda, Fujisawa; Toshio Murakami, Yokohama, both of Japan

[73] Assignee: Hitachi, Ltd., Tokyo, Japan

[21] Appl. No.: 192,999

[22] Filed: Oct. 2, 1980

[30] Foreign Application Priority Data

Oct. 3, 1979 [JP] Japan .................................. 54-126851

[51] Int. Cl.³ .......................................... H04N 3/15
[52] U.S. Cl. .......................................... 358/213
[58] Field of Search .............. 358/212, 213, 294, 209, 358/41, 160; 250/208, 209, 211 J; 357/30; 307/311

[56] References Cited

U.S. PATENT DOCUMENTS 4,274,113  6/1981  Ohba ................................. 358/213
4,283,742  8/1981  Izumita ............................. 358/213

OTHER PUBLICATIONS

Weimer, Multielement Self-Scanned Mosaic Sensors, Mar. 1969, IEEE Spectrum, pp. 52-65.
Plummer, A Low Light Level Self-Scanned MOS Image Sensor, 1972, IEEE International Solid State Circuits Conference, pp. 30-31.

*Primary Examiner*—Michael A. Masinick
*Attorney, Agent, or Firm*—Craig and Antonelli

[57] ABSTRACT

In a signal processing circuit for use in a solid-state camera having a solid-state image sensor for converting picture elements composing an optical image to electrical signals. The circuit comprises a sensor for sequentially sensing the electrical signals representing the picture elements output of the solid-state image sensor, a converter for converting the output signal of the sensor into a first and a second signal which are respectively in phase with and opposite phase to the output signal of the sensor, first and second integrators for integrating the first and second signals for each picture element respectively, and a differential amplifier for producing an output signal representing a difference between two outputs of the first and second integrator as a video signal.

8 Claims, 12 Drawing Figures

SIGNAL PROCESSING CIRCUIT FOR SOLID-STATE CAMERA

BACKGROUND OF THE INVENTION

1. Field of the Invention

The present invention relates to a signal processing circuit for a television camera using a solid-state image sensor.

2. Description of the Prior Art

Figure 1:
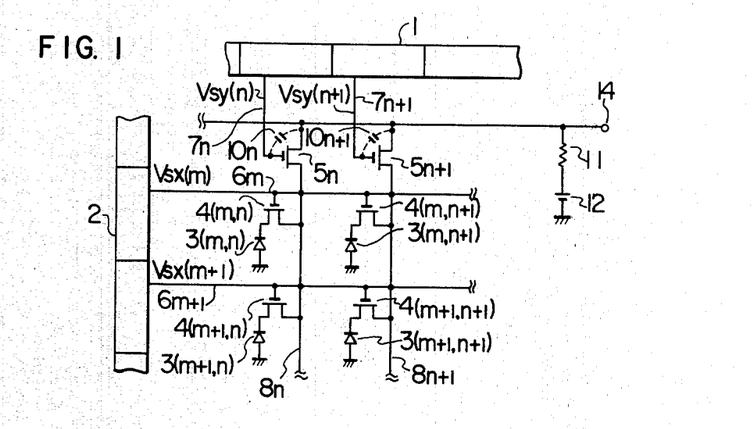
FIG. 1 is a schematic diagram showing a sensor of a solid state camera.

Recently, a solid-state camera consisting of a semiconductor integrated circuit has been developed, instead of a camera tube used in the past, as an imaging device such as a television camera. One example of the solid-state camera is described and shown in "IEEE Spectrum, March 1969, P. 52–64". FIG. 1 schematically shows a sensor of such a solid-state camera. In this FIG. 1 denotes a horizontal scanning circuit, 2 denotes a vertical scanning circuit, 3 (3(m, n), 3 (m, n+1) . . .) denote a plurality of photodiodes operating as photoelectric conversion devices, which are arranged like a matrix in a solid-state image sensor, 4 (4(m, n), 4(m, n+1) . . . ) denote vertical switching MOS transistors which are arranged similarly to the photodiodes and a source of each of which is connected to a cathode of a corresponding one of the photodiodes, 5 (5n, 5n+1, . . . ) denote horizontal switching MOS transistors, each of which is provided for corresponding to one row of a matrix array of the photodiodes 3, 6 (6m, 6m+1 . . . ) denote vertical scanning lines which are provided in correspondence with lines of the matrix array of the photodiodes 3 and each of which is connected to a gate of the MOS transistor 4 of a corresponding one line of the matrix array of the photodiodes, 7 (7n, 7n+1, . . . ) denote vertical scanning lines which are provided in correspondence with the MOS transistors 5 and each of which is connected to a gate of corresponding one of the MOS transistors 5, 8 (8n, 8n+1, . . . ) denote vertical scanning lines which are provided in correspondence with rows of the matrix array of the photodiodes 3 and each of which is connected to a source of the MOS transistor 5 and a drain of the MOS transistors 4 of corresponding one row, and 9 denotes a horizontal signal line connected to a drain of the MOS transistors 5, where suffixes n, n+1, etc. mean n-row, (n+1)-row, etc. respectively, and suffixes m, m+1, etc. mean m-line, (m+1)-line, etc. respectively. The photodiodes 3 and the MOS transistors 4 and 5 compose a solid-state image sensor.

Figure 2:
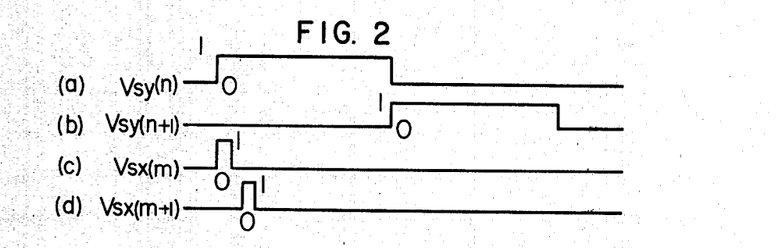
FIG. 2 is a waveform chart showing a horizontal scanning pulse and a vertical scanning pulse used in the sensor shown in FIG. 1.

An outline of a signal reading method of the solid-state camera described above will now be described. Each of the photodiodes 3 which are arranged like a matrix receives optical image light and stores photoelectrons in its junction capacitance in accordance with the quantity of light received. When the vertical scanning circuit 2 generates a positive scanning pulse $V_{sy(n)}$ shown in FIG. 2(a) on the vertical scanning line 6m, a row of the vertical switching MOS transistors 4 (m, n), 4 (m, n+1) . . . connected thereto are turned on. Subsequently, when the horizontal scanning circuit 1 generates a positive scanning pulse $V_{sx(m)}$ shown in FIG. 2(c) on the horizontal scanning line 7n, the horizontal switching MOS transistor 5n is turned on and therefore the photoelectrons stored in the photodiodes are brought through the MOS transistor 5n to an output terminal 14 so that a video signal is obtained. A predetermined time later, when a positive scanning pulse $V_{sx(m+1)}$ shown in FIG. 2(a) is supplied on the horizontal scanning line 7n+1, the horizontal switching MOS transistor 5n+1 is turned on so that the photoelectrons stored in the photodiodes 3(m, n+1) are brought to the output terminals. When sequential reading of the photodiodes of the m-th line in the manner described above has been terminated, a vertical scanning pulse $V_{sy(n+1)}$ shown in FIG. 2(b) is supplied on the vertical scanning line 6m+1 instead of said vertical scanning pulse $V_{sy(n)}$ being supplied on the vertical scanning line 6m. Thus, the photoelectrons stored in the photodiodes 3(m+1, n), 3(m+1, n+1) are read out sequentially by horizontal scanning similar to that described above. The photoelectrons stored in all of the photodiodes are read out by sequentially repeating the vertical scanning and the horizontal scanning similar to those described above.

Figure 3:
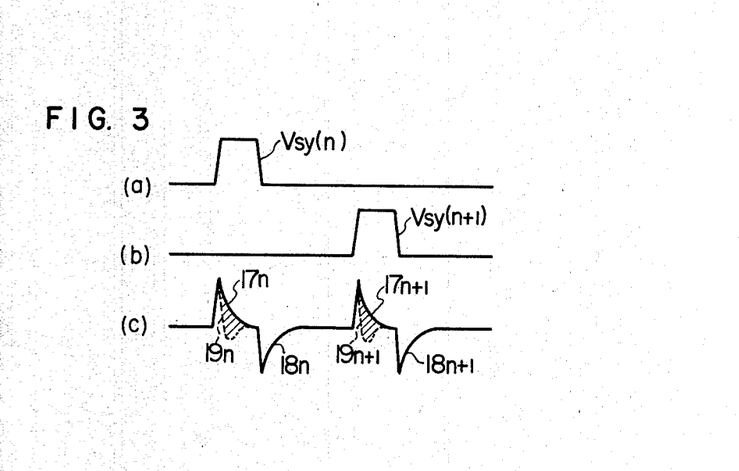
FIG. 3 is a waveform chart showing a horizontal scanning pulse and an output signal of the sensor shown in FIG. 1.

FIG. 3(a) shows a waveform of the horizontal scanning pulse $V_{sy(n)}$ applied to a gate of the horizontal switching MOS transistor 5n of the n-th row. FIG. 3(b) shows a waveform of the horizontal scanning pulse $V_{sy(n+1)}$ applied to a gate of the horizontal switching MOS transistor 5n+1 of the (n+1)-th row. FIG. 3(c) shows a signal waveform obtained at the output terminal 14 (see FIG. 1). Spike-like voltage transistors 17n, 17n+1 and 18n, 18n+1, which are referred as spike noises, are generated such a manner that the horizontal scanning pulses are differentiated by parasitic capacitor 10n, 10n+1, etc. between the horizontal signal line 9 and the horizontal scanning line 7n, 7n+1, etc. or the MOS transistors 5n, 5n+1, etc. and transmitted along the horizontal signal line 9. A dotted line 19n, 19n+1 show signal waveforms obtained at the output terminal 14 in the case where video signal charges are provided, and an oblique line part denotes a video signal component.

If the spike noise at every scanning point always has a constant shape, the frequency components of the spike noise consist of only a repetition frequency thereof and its higher harmonic frequencies which are higher than frequency components of the video signal. Therefore, such a noise can be readily removed and thus its adverse effect on the video signal is little.

Figure 4:
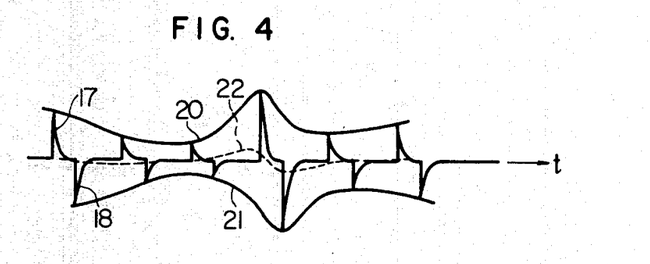
FIG. 4 is a waveform chart showing a spike noise which appears at an output of the sensor shown in FIG. 1.

However, the amplitude and the shape of the spike noise, in fact, are largely varied with changing of the horizontal scanning pulse waveform $V_{sy(n)}$, $V_{sy(n+1)}$ and with variation of the parasitic capacitance 10n, 10n+1, accordingly a waveform similar to an amplitude modulated wave as shown in FIG. 4 is adversely provided. However, since this waveform is different from a normal amplitude modulated wave so that a carrier frequency (it corresponds to the repetition frequency) is adjacent to a modulation frequency (a frequency by which the spike noise waveform is varied), there is a time lag between an envelope 20 of a positive spike noise and an envelope 21 of a negative spike noise. Accordingly lower frequency components than the repetition frequency of the spike noise are included as shown by a dotted line 22. Since the bandwidth of the lower frequency components is the same as that of the video signal, the lower frequency components can not be removed by a low-pass filter so that they interfere with the video signal as a false signal. Particularly, the false signal is commonly superimposed on output signals of rows of photodiodes 3(m, n), 3(m+1, n) . . . ; 3(m, n+1), 3(m+1, n+1) . . . commonly connected to the vertical signal lines 8n, 8n+1 respectively so that it appears as a noise forming a fixed pattern of vertical stripes on a produced picture. This noise is so conspicious that quality of the produced picture is largely degraded.

Figure 5:
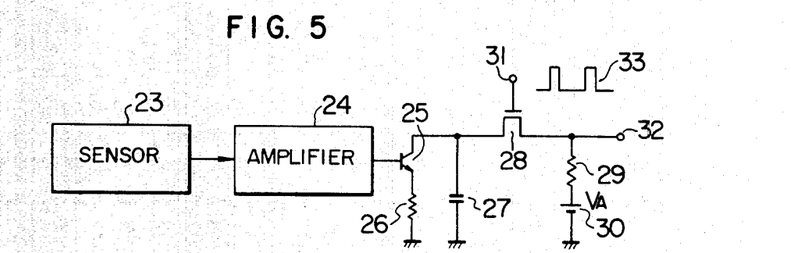
FIG. 5 is a circuit diagram showing a typical example of a signal processing circuit employing an integrating circuit system in accordance with prior art.
Figure 6:
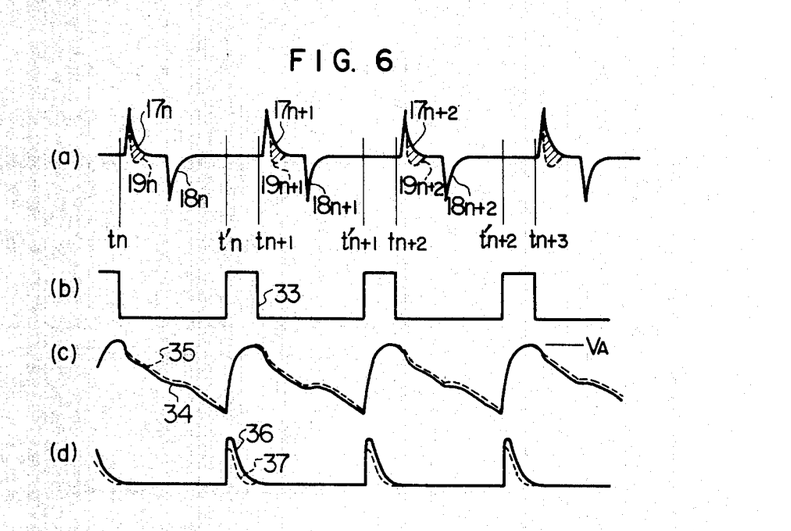
FIG. 6 is a waveform chart showing signals of respective parts of the circuit shown in FIG. 5.

In view of the above, a signal processing circuit employing an integrating circuit system has been provided for removing the fixed pattern noise. An example of such a signal processing circuit is described and shown in "IEEE International Solid-State Circuit Conference, Feb. 16, 1972, p. 30-31". FIG. 5 shows an integrating circuit which operates similarly to just before described example. In this figure, 23 denotes a sensor of the solid state camera described in connection with FIG. 1, 24 denotes an amplifier, 27 denotes an integrating capacitor, 28 denotes a MOS transistor used as a reset switch for integrating, 29 denotes a load resistor, 30 denotes a DC source, 31 denotes a terminal to which a reset pulse is to be applied, and 32 denotes a signals output terminal. The transistor 25 and an emitter resistor 26 comprise a common emitter amplifier, FIG. 6 shows an operating voltage waveform or an operating current waveform of an essential part of the circuit shown in FIG. 5. Operation of the circuit will now be described using this figure. A signal whose waveform is shown in FIG. 6(a) is applied through the amplifier 24 to a base of the transistor 25 from the sensor 23. Although, exactly speaking, spike noise couples, each of which is consisted of a positive spike and a negative spike which follows the positive spike, are different in their magnitude and shape as described in connection with FIG. 4, the spike noise is shown by a waveform having constant magnitude and shape to avoid complexity. In order for the transistor 25 to operate with good linearity, an appropriate DC bias voltage is superimposed on the output from the sensor part by the amplifier 24. FIG. 6(a) shows a waveform which is obtained from such a superimposing. FIG. 6(b) shows a waveform of a reset pulse which turn the MOS transistor or the integrating reset switch 28 on when the reset pulse is high, and which turn the MOS transistor 28 off when the reset pulse is low. The reset pulse has the same frequency as that of the horizontal scanning pulse shown in FIGS. 2(c), (d), and has a predetermined phase relation with the horizontal scanning pulse.

It is assumed that the MOS transistor 28 has been turned on before the time tn. The integrating capacitor 27 is charged to a voltage $V_A$ of the power source 30 with taking no account of a voltage drop of the load resistor 29. When the transistor 28 is turned off at the time tn, the charges stored in the integrating capacitor 27 are discharged through the transistor 25. At this time, a base of the transistor 25 is biased by a voltage shown in FIG. 6(a) so that the discharged current is a current controlled by the waveform shown in FIG. 6(a). Accordingly, a voltage across the integrating capacitor 27 (a collector voltage of the transistor 25) is reduced along a waveform shown in FIG. 6(c). In FIG. 6(c), a solid line 34 denotes the voltage across the capacitor 27 in the case where a signal applied to the base of the transistor 25 is consisted of only the spike noise, and a dotted line 35 denotes the voltage across the capacitor 27 in the case where the spike noise is superimposed on the video signal.

A value of a voltage drop of the capacitor 27 is proportional to the value of an integrating of the collector current of the transistor 25 between the time equals tn and the time equals t'n or the summation of the discharged charges between the time equals tn and the time equals t'n, and is inversely proportional to the capacitance value of the integrating capacitor. If a start point tn and an end point t'n of an integrating period is determined so that both of the positive spike noise component 17n and the negative spike noise component 18n are completely involved, the positive spike component and the negative spike component which is adjacent to the positive spike are cancelled each other to become zero by integrating because of the positive spike component level being the same as the negative component. Therefore, the sum of the discharged charges is not influenced by the spike noise. The integrating value becomes the sum of the value due to the DC bias current for the transistor and the value due to signal current component 19n.

Next, when the integrating reset switch is turned on at the time t'n, the integrating capacitor 27 is again charged through the load resistor to the voltage $V_A$ of the power source 30 so that the quantity of charged charges is approximately equal to the charges discharged during the period between tn and t'n (more precisely, a current which flows the transistor 25 during the period between t'n and tn+1 is involved). Therefore, the signal component without the spike noise component can be obtained by taking out this charging current (curve 36 of FIG. 6(d)) as a voltage drop of the load resistor 29. In FIG. 6(d), 36 denotes a waveform of the charging current in the case where the output of the amplifier 24 contains only the DC bias component but no the video signal component, a dotted line 35 denote a waveform of the charging current in the case where the video signal component is also contained. Therefore, the video signal is lower components (average value of dotted line 37) which are obtained by passing the waveform shown in FIG. 6(d) through a low-pass filter.

While the operating principle of the signal processing circuit has been described, attention should be made on the following matters. First, to make spike noise cancelling effect higher, the end point t'n of the integrating period should be delayed as much as possible. Second, since the interval between the end point t'n and a subsequent start point $t_{n+1}$ becomes shorter because of delaying the point t'n, resetting of the integrating (charging of the integrating capacitor) is not sufficiently occured so that the output signal components of adjacent photodiodes of the same line may be interferred with each other so as to degrade the resolution. To avoid this, it is required that the load resistor 29 is properly selected to lower value, the resistance of the MOS transistor 28 or the reset switch when the transistor 28 is on is sufficiently low and a time constant of the charging circuit becomes shorter. Further, it is required that a switching time of the transistor 28 is sufficiently short. Above described signal processing circuit according to prior art has the following drawbacks.

First, a waveform of the signal which appears on the output terminal 32 is like a pulse wave with small duty ratio (as shown in FIG. 6(d)) which the quantity of a constant component due to the DC bias current component is larger than the quantity of the video signal component (transition component of the magnitude of the pulse 36 corresponding to the difference between the waves 36 and 37). Therefore, to extract only the signal component, a low-pass filter with good attenuating characteristic is required. Further, this low-pass filter should be disposed just behind the output terminal 32 for the reason why if the signal is directly supplied to a next stage amplifier without passing the signal through the low-pass filter, the amplifier is immediately saturated in response to the application thereof. This is a serious obstacle to integrated the circuit. Further, in order to fabricate the low-pass filter with good attenuating characteristic, it is required that inductances and capacitances used in the filter is large so that it is difficult to integrate the circuit.

Second, a noise voltage contained in the reset pulse 33 is transmitted through a parasitic capacitance between electrodes of the integration reset switching MOS transistor 28 or a mutual conductance of the transistor 28 to the signal line so that a signal to noise ratio of the video signal becomes lower. The transmission manner of the noise voltage is extremely complicated so that quantative analysis is difficult. However, in accordance with experiments, it has been found that the degradation of the signal to noise ratio is not negligible in the case where the magnitude of the signal component is about 100 mV in peak-to-peak value. Although, the noise of the type is theoretically suppressed by removing the noise contained in the integrating reset pulse 33, in fact it is difficult to remove the noise in the reset pulse completely and thus the trailing edge of the pulse in particular contains a considerable amount of noise.

SUMMARY OF THE INVENTION

It is therefore an object of the present invention to provide a signal processing circuit to overcome two drawbacks of the prior art described above for obtaining the video signal in which superfluous noise is reduced so that signal to noise ratio of the video signal is higher from an output of a solid state camera.

In accordance with the present invention, a signal to be processed containing spike noise is converted into differential signals or a first signal and a second signal which are in opposite-phase relation each other, and subsequently the first signal and the second signal are applied to two circuit for integrating and resetting the integrating such as the prior art circuits described above respectively. Two pulse like signal waveforms in which the spike noise is removed and whose signal components are in opposite phase relation to each other are obtained as output signals of said two circuits respectively. Next, these two pulse like signal waveforms are applied to two input terminals of a differential amplifier in which constant components (components in phase) of the two pulse like signal waves are removed simultaneously with the noises equally produced in said two pulse like signals due to noise in a reset pulse being cancelled so that only a video signal component (components in opposite phases) is obtained at an output of the differential amplifier.

The foregoing and other objects, features and advantages of the invention will be apparent from the following more particular description of preferred embodiments of the invention as illustrated in the accompanying drawings.

DESCRIPTION OF THE PREFERRED EMBODIMENTS

The present invention will now be described in connection with preferred embodiments thereof.

Referring now in greater detail to the various figures of the drawings wherein like numerals refer to like numbers.

Figure 7:
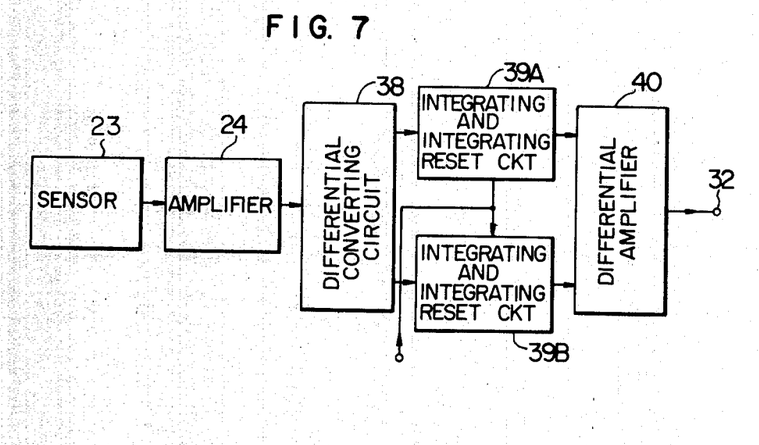
FIG. 7 is a block diagram showing a signal processing circuit in accordance with the present invention.

FIG. 7 is a block diagram showing a typical example of a signal processing circuit according to the present invention. In this figure, 23, 24, 31, 32 denote a sensor of a solid state camera, an amplifier, a terminal to which a reset pulse is applied, and a signal output terminal respectively as described in connection with the prior art circuit. 38 denotes a differential converting circuit which convert an input signal to be processed into differential signals A and B which are in opposite phase relation with each other, 39A and 39B denote an integrating and integrating reset circuit for integrating and resetting the integrating of said differential signals A and B respectively to remove a spike noise from said signals, and 40 denotes a differential amplifier, inputs of which receive output signals from said integrating and integrating reset circuit 39A and 39B respectively. Inputs at the circuits 39A and 39B are that their signal components are in opposite phase with each other and bias current components are equal. Accordingly, pulse like signal waveforms obtained at outputs of the circuits 39A and 39B are that only signal components (pulse magnitude transition components) are in opposite phase relation with each other and pulse constant components and noise components produced due to the noise in the reset pulse are equal. When the two pulse like signal waveforms in such a relation are amplified by the differential amplifier, the pulse constant components and the noise component which are in phase and equal are cancelled so that only the signal components which are in opposite phase relation with each other are amplified and obtained at the output terminal 32.

Figure 8:
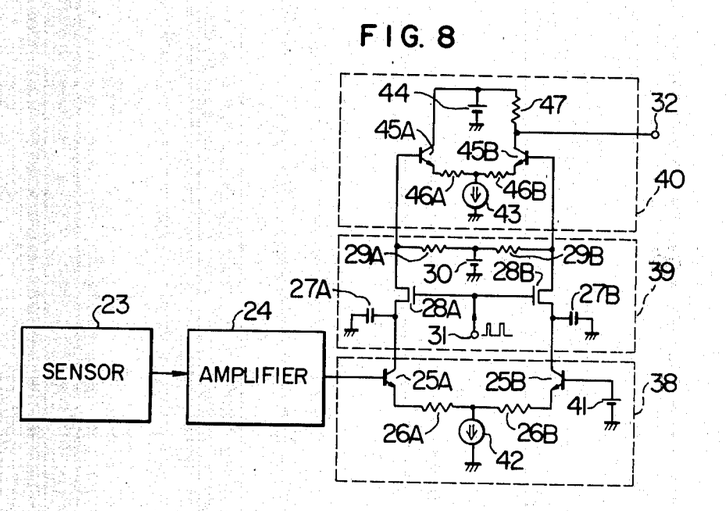
FIG. 8 is a circuit diagram showing a first embodiment of the signal processing circuit according to the present invention.
Figure 9:
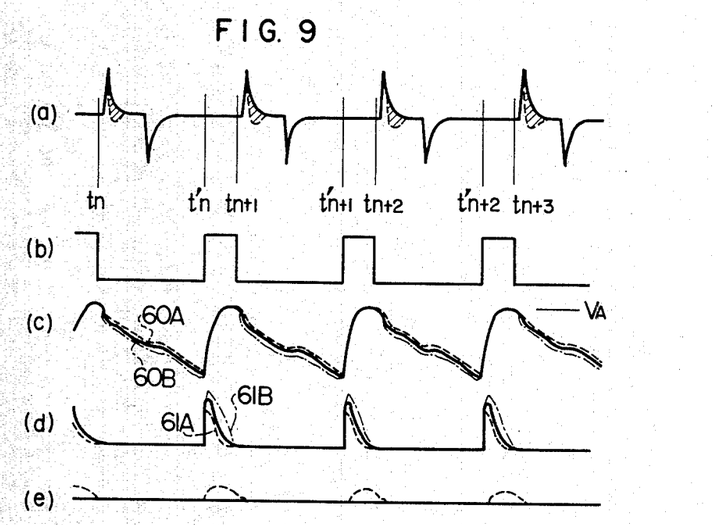
FIG. 9 is a waveform chart showing signals of respective parts of the circuit shown in FIG. 8.

FIG. 8 shows a first embodiment which embodies the block of FIG. 7. In FIG. 8, dotted rectangles 38, 39 and 40 correspond to respective parts described in connection with FIG. 7. FIG. 9 is a waveform chart showing signals of respective parts of the circuit shown in FIG. 8.

Switching devices such as NPN transistors 25A and 25B, resistances 26A and 26B, a constant-current source 42 and a DC voltage source 41 comprise the differential converting circuit 38. The output voltage of the voltage source 41 is the same as the bias level applied to a base of the transistor 25A. The base of the transistor 25A is connected to an output of the amplifier 24, an emitter of the transistor 25A is connected through the resistor 26A to one terminal of the constant-current source 42, a base of the transistor 25B is connected to an anode of the DC voltage source 41, and an emitter of the transistor 25B is connected through the resistor 26B to the one terminal of the constant-current source 42. The transistors 25A, 25B are connected to the differential amplifier so that the signal to be processed is converted into the differential signals. The signal to be processed as shown in FIG. 9(a) (a solid line denotes the case where the spike noise is superimposed on the bias current, and a dotted line denotes the case where the video signal component is also superimposed) is applied to the base of the transistor 25A. Accordingly, the collector currents of the transistor 25A, 25B are such that the bias current components are equal and only the signal components are in opposite phase relation with each other.

An integrating capacitor 27A, a MOS semiconductor device such as a MOS transistor 28A, a load resistor 29A and a DC voltage source 30 comprise the integrating and integrating reset circuit 39A. An integrating capacitor 27B, a MOS seminconductor device such as a MOS transistor 28B, a load resistor 29B and the voltage source 30 comprise the integrating and integrating reset circuit 39B. The organization of the integrating and integrating reset circuits 39A, 39B are the same as that of the prior art circuit described in connection with FIG. 5. The reset pulse (see FIG. 9(b)) is commonly applied to the circuits 39A, 39B through the terminal 31. The reset pulse may be the same as that used in the circuit shown in FIG. 5. Drains of the MOS transistors 28A, 28B are connected to collectors of the transistors 25A, 25B respectively. Each of the integrating and integrating reset circuits 39A, 39B integrates and removes the spike noise contained in the base current of the transistors 25A, 25B of the differential converting circuit 38 similarly to the circuit shown in FIG. 5. FIG. 9(c) shows collector voltage waveforms of the transistors 25A, 25B. In this figure, a solid line denotes the case where the signal to be processed does not contain the video signal component, a dotted line 60A denotes the collector voltage waveform of the transistor 25A, in the case where the video signal component is not contained, and a chain line 60B denotes the collector voltage waveform. Since the integrating reset switching MOS transistors 28A and 28B are turned on or off by the same reset pulse, pulse like signal waveforms produced in the load resistors 29A and 29 are that the pulse constant components are equal and only the signal components (the pulse magnitude transition components) are in opposite phase relation with each other. The noise due to the noise involved in the reset pulse is superimposed in each of the circuits 39A, 39B, but the noises of this type flowing in the load resistors 29A and 29B are in phase relation with each other. Therefore, each of waveforms of the pulse like signals flowing the load resistors 29A, 29B contain the pulse constant component, the video signal component, and the noise component due to the reset pulse noise. FIG. 9(a) shows the pulse like signal waveform. In this figure, a solid line denotes a signal flowing the resistor 29A in the case where the video signal component is not involved, a dotted line 61A denotes a signal flowing the resistor 29A in the case where the video signal component is involved, 61B denotes a signal flowing in the resistor 29B.

The NPN transistors 45A, 45B, the resistors 46A, 46B, the constant-current source 43, the DC voltage source 44 and the load resistor comprise the differential amplifier 40. Bases of the transistors 45A, 45B are connected to the sources of the MOS transistors 28A, 28B respectively and a collector of the transistor 45B is connected to the output terminal 32. When the pulse like signal waveforms flowing in the load resistors 29A, 29B are applied to the differential amplifier respectively, the pulse constant components and the noises due to the reset pulse noises which are equal are cancelled and only the video signal component (FIG. 9(e)) is amplified and brought to the output terminal 32.

Figure 10:
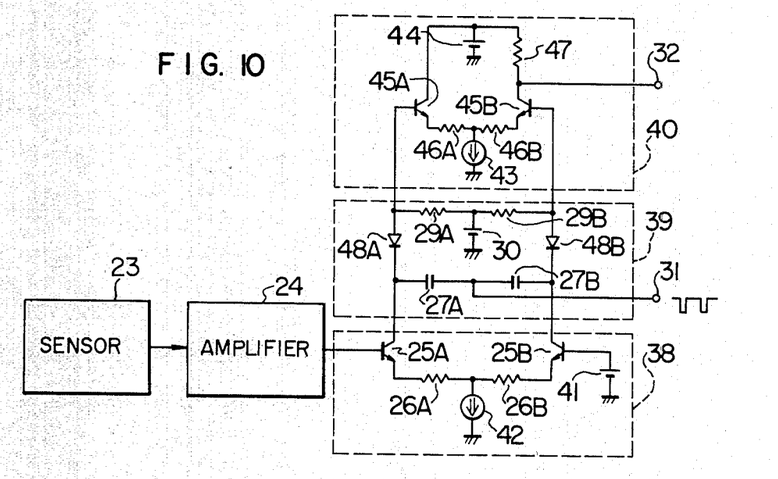
FIG. 10 is a circuit diagram showing a second embodiment of the signal processing circuit in accordance with the present invention.

FIG. 10 shows a second embodiment of the present invention in which bipolar semiconductor devices such as diodes 48A, 48B are used as integrating reset switching devices instead of the MOS semiconductor devices or the MOS transistors 28A, 28B in the first embodiment of the integrating and integrating reset circuit. In FIG. 10, dotted line rectangles 38, 39 and 40 denote a differential converting circuit, an integrating and integrating reset circuit, and a differential amplifier similarly to the first embodiment. The organization of the circuits 38 and 40 is the same as that of the first embodiment. The structure and operation of the integrating and integrating reset circuit will now be described. An integrating capacitor 27A, an integrating reset switching diode 48A, a load resistance 29A and a constant-current source 30 comprise the integrating and integrating reset circuit 39A, and an integrating capacitor 27B, an integrating reset switching diode 48B, a load resistor 29B and the voltage source 30 comprise the integrating and integrating reset circuit 39B.

Figure 11:
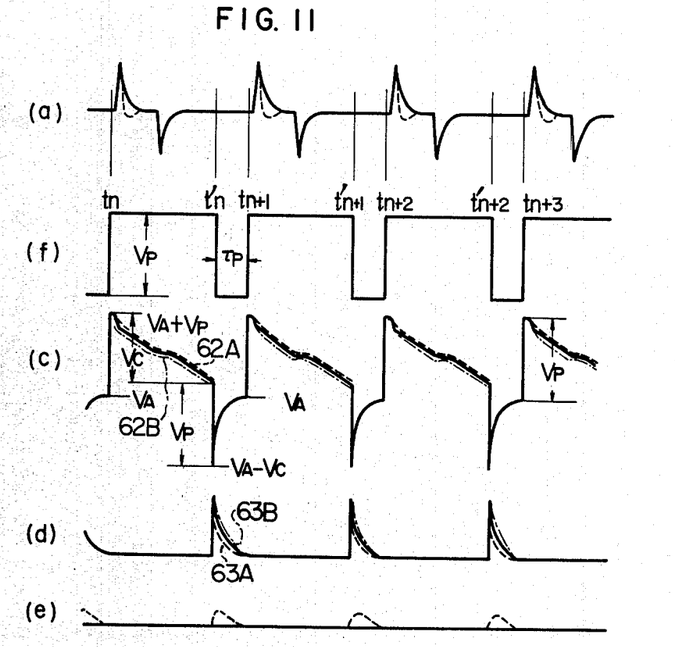
FIG. 11 is a waveform chart showing signals of respective parts of the circuit shown in FIG. 10.

An anode of the diode 48A is connected through the load resistor 29A to the DC source 30, and a cathode of the diode 48A is connected to a collector of the transistor 25A and through the capacitor 27A to the reset pulse input terminal 31. Similarly, an anode of the diode 48B is connected through the load resistance 29B to the DC source 30, and a cathode of the diode 48B is connected to a collector of the transistor 25B and through the capacitor 27B to the terminal 31. According to the present embodiment, the circuit is more readily integrated in comparison with the first embodiment because bipolar semiconductor devices (diode 48A, 48B) are used as integrating reset switching devices. FIG. 11 is a waveform chart used for explaining operation of this circuit. FIG. 11(a) shows a voltage waveform of a signal to be processed which is applied to a base of the transistor 25A. In FIG. 11(a), a solid line denotes a spike noise component and a dotted line denotes a waveform which a video signal component is superimposed on the spike noise. FIG. 11(b) shows a reset pulse waveform applied to the terminal 31. FIG. 11(c) shows a collector voltage waveform of the transistors 25A and 25B. In FIG. 11(c), a solid line denote the case the signal to be processed does not contain the video signal component (the case denoted by the solid line of FIG. 11(a)). In this case, collector voltages denoted by 25A and 25B are equal. A dotted line 62A and a chain line 62B denote respectively collector voltage waveforms of the transistors 25A and 25B in the case where the signal to be processed contains the video signal component (the case denoted by the dotted line shown in FIG. 11(b)).

FIG. 11(d) shows current waveforms flowing the load resistors 29A and 29B respectively. In FIG. 11(d), a solid line, a dotted line 63A and a chain line 63B correspond to those of FIG. 11(c). FIG. 11(e) shows a video signal voltage waveform obtained on the output terminal 32. In FIG. 11(e), a dotted line denotes a waveform produced by the video signal component.

It is assumed that the reset pulse has been low and charging of the integrating capacitor has already been completed so that the collector potential of the transistor 25A (25B) has been equal to the voltage $V_A$ of the source 30. Precisely stated, a voltage drop of the diodes and a voltage drop due to the collector current of the transistor 25A (25B) flowing the load resistor 29A (29B) should be subtracted from $V_A$. However, these voltage drops are small, so the description will now be carried out on the assumption that these voltage drops are negligible. Further, it is assumed that the diodes are ideal diodes having no offset voltage. When the reset pulse is transmitted from the low level to the high level by amount of the voltage $V_p$ at the time $t_n$, the collector potential of the transistor 25A (25B) is increased to $(V_A + V_B)$ by the reset pulse voltage $V_p$ as shown in FIG. 11(c) because the voltage across the integrating capacitor can not change rapidly. On that condition, the integration reset switching diode 38A (38B) is reversely biased and becomes a cut-off state. During the time from $t_n$ to $t'_n$, all of the collector current of the transistor 25A (25B) containing a DC component flows into the integrating capacitor 27A (27B). Accordingly, the charges stored in the capacitor 27A (27B) reduces and the voltage across the capacitor 27A (27B) becomes lower as time goes by. Therefore, the collector voltage waveform of the transistor 25A (25B) is lowered as shown by the dotted line (the chain line) of FIG. 11(c). The voltage variation $V_c$ during the time from $t_n$ to $t'_n$ is equal to the integrating value of the collector current or the charges discharged during this period divided by the capacitance value of the capacitor. Accordingly, if the capacitance value of the capacitor, the collector current, the amplitude of the reset pulse, the pulse width and these relation are determined so that the condition $V_c \leq V_p$ is satisfied, the cut-off state of the diode 38A (38B) is maintained.

Subsequently, when the reset pulse is changed from the high level to the low level by voltage $V_p$, the collector potential of the transistor 25A (25B) is lowered to $(V_A - V_c)$ as shown in FIG. 11(c) so that the diode 38A (38B) is forwardly biased and turned on. In fact, some amount of time is consumed for trailing edge of the pulse so that a tip of the waveform become dull. This prevents the collector potential from being lowered to $(V_A - V_c)$. However, it is negligible on the description of the principle. At the time when the collector potential has been lowered to $(V_A - V_c)$, it begins that the capacitor 27A (27B) is charged by the voltage source 30. The time constant of charging is the product of the capacitance value of the integrating capacitor and the resistance value of the load resistor 29A (29B). If the time constant is set to be sufficiently lower than the pulse width $\tau_p$ of the reset pulse, rapid charging of the capacitor 27A (27B) is allowed so that the collector potential of the transistor 25A (25B) is rapidly increased from $(V_A - V_c)$ to $V_A$ as shown in FIG. 11(c) and charging will be almost terminated at the time $T_{n+1}$ when the low level period of the pulse is terminated. At this time, the circuit state is returned to the state of the time $t_n$. The charging current waveform of the capacitor during the time from $t'_n$ to $t_{n+1}$ is shown in FIG. 11(d). It refers as integrating reset that the state of the integrating capacitor is returned to the state before integrating. A pulse and diodes 48A (48B) which do this refer as a reset pulse and reset switching diodes respectively. Above described operation during the time period from $t_n$ to $t_{n+1}$ is successively repeated. Since the collector currents of the transistor 25A and 25B are that these bias current components (the constant components) are equal and the spike noise components and the video signal components of both collector current are in opposite phase relation with each other, a difference of both currents is produced only with respect to the video signal component in the integrating value of the current or the amount of the charges discharged from the capacitor 27A (27B) during the time from $t_n$ to $t'_n$ for the reason why the integrating values of the spike noise components of both currents are equally zero. Said difference is shown in the difference between a dotted line and a chain line in FIG. 11(c).

The amount of charges charged during the time period from $t'_n$ to $t_{n+1}$ is equal to the amount of charges discharged as the collector current of the transistor 25A (25B) during the time period from $t_n$ to $t'_n$ and is proportional to the integrating value of the collector current during the time period from $t_n$ to $t'_n$. Accordingly, if the voltage waveform across the load resistor 29A (29B) which is produced by the charging current which has the waveform shown in FIG. 11(d) and which flows through the load resistor 29A (29B) during the time period from $t'_n$ to $t_{n+1}$ is taken out, the positive and negative spike noise are cancelled so that the signal without fixed pattern noise is obtained. However, this voltage waveform includes the pulse constant component which is pointed out as the drawback of the prior art circuit. Therefore, this voltage waveform is input into the bases of the transistors 46A and 46B in the differential amplifier 40 so that the pulse constant component are cancelled and the video signal component voltage having a waveform denoted by a dotted line of FIG. 11(e) is obtained. In this circuit, the noises due to the noises included in the reset pulse are cancelled in the differential amplifier in the same manner as the first embodiment.

In the second embodiment, it should be noted that the charging time constant determined by the integrating capacitor and the load resistance is set to be smaller than the pulse width $\tau_p$. In the case where the solid-state camera scans the photo diodes at the period of 140 nSec, for example, the reset pulse width $\tau_p$ is 50 nSec, the capacitance of the integrating capacitor is 40 pF, the load resistance is 150 Ω, and the charging time constant is 6 nSec. If the capacitance of the capacitor is set to be very small, the collector voltage drop $V_c$ of the transistor 25A (25B) shown in FIG. 11(c) becomes higher. Therefore, it is required that the reset pulse magnitude $V_p$ become larger in accordance with the collector voltage drop being higher. If the load resistance is set to be very small, the signal voltage across the load resistor become smaller. Thus, the capacitance of the capacitor and the load resistance defining the charging time constant should be carefully determined.

The third embodiment, which removes the limitation relate to determining of the load resistor so that the signal voltage will be sufficiently taken out, will now be described with reference to FIG. 12. In this embodiment, transistors are employed instead of the diodes 48A, 48B which are employed as the integrating reset switching bipolar semiconductor devices in the second embodiment.

Figure 12:
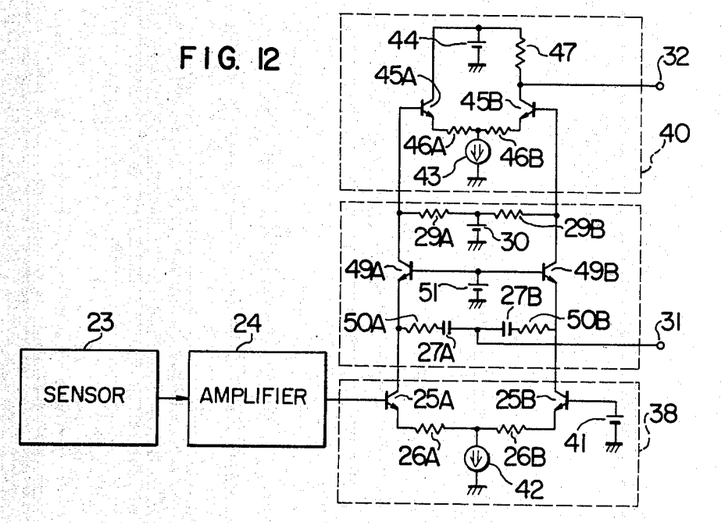
FIG. 12 is a circuit diagram showing a third embodiment of the signal processing circuit according to the present invention.

Referring to FIG. 12, 49A (49B) denotes an integrating reset switching transistor, 50A (50B) denotes a resistor used for setting the charging time constant, 51 denotes a DC source of voltage $V_A$, 30 denotes a DC source of voltage $V_p$ higher than the voltage $V_A$. Other parts are the same parts or perform the same function as the parts denoted by the same numerals in the second embodiment. Bases of the transistors 49A, 49B are connected to the DC source 51. A collector of the transistor 49A is connected through a resistor 29A to the DC source 30. An emitter of the transistor 49A is connected through the resistor 50 and the capacitor 27A to a reset pulse input terminal 31 and is connected to a collector of the transistor 25A. A collector of the transistor 49B is connected through the resistor 29B to the DC source 30. An emitter of the transistor 49B is connected through the resistor 50B and the capacitor 27B to the terminal 31 and is connected to a collector of the transistor 25B.

Reference will be made again to FIG. 11 for describing the third embodiment. It is assumed that the reset pulse was low level and integrating of the capacitor 27A (27B) has been terminated just before the time $t_n$ so that the collector potential of the transistor 25A (25B) is equal to the voltage $V_A$ of the source 51. For the purpose of the description, an offset voltage $V_b$ between a base and an emitter of a transistor is negligible.

When the reset pulse changes from low level to high level at the time $t_n$, the collector potential of the transistor 25A (25B) is increased to $(V_A+V_p)$ by the reset pulse voltage $V_p$ as shown in FIG. 11(c). In this state, bias is reversely applied to between the base and the emitter of the transistor 49A (49B) so that the transistor 49A (49B) becomes cut-off state. The operation of the second embodiment during the time period from $t_n$ to $t'_n$ is the same as that of the second embodiment. The collector voltage waveform of the transistor 25A (25B) is lowered in proportion to the integrating value of the collector current. During the time period from $t_n$ to $t'_n$, the transistor 49A (49B) is maintained in the cut-off state.

At the time when the reset pulse changes from the high level to the low level by $V_p$, the collector potential of the transistor 25A (25B) is lowered as shown in FIG. 11(c) and bias is forwardly applied to between the base and the emitter of the transistor 49A (49B) so that the transistor 49A (49B) becomes an active state. In fact, the collector potential is not lowered to $(V_A-V_c)$ because some amount of time is consumed for the trailing edge of the pulse and the charging time constant defined by the product of the resistor 50A (50B) and the capacitor 27A (27B) is small. However, it is negligible. At the same time, it begins that the capacitor 27A (27B) is charged through the load resistor 29A (29B) and the transistor 49A (49B) from the source 30. The charging time constant of this time is defined by the product of the resistor 50A (50B) and the capacitor 27A (27B) and does not depend on the value of the load resistor 29A (29B). This makes the third embodiment to be different from the second embodiment. According to the second embodiment, the resistor can be set to be appropriate value so that the signal voltage of enough value can be taken out. The charging will be almost terminated by the end of the pulse period $t_{n+1}$ and the same state will be occurred at the initial state at the time $t_n$. This operation is repeated similarly to the second embodiment. In the same manner as the second embodiment, the spike noises are removed.

Summarizing the features of the third embodiment, the transistor 49A (49B) is not only operated as the integrating reset switch using the rectifying characteristic of the base-emitter junction but is also operated as a grounded-base amplifier. Accordingly, the value of the load resistance can be determined independently of the charging time constant so that the large signal voltage can be obtained by increasing the value of the load resistor. It is noted that the values of the resistors 50A and 50B may be set to be zero, that is, the resistors 50A and 50B can be deleted. In this case, the charging time constant is defined by the values of the emitter resistor of the transistor 49 and the integrating capacitor. In the third embodiment, since the pulse constant and the noise are involved in the voltage waveform across the load resistor 29A (29B), in the same manner as the second embodiment, the voltage is applied to the differential amplifier 40 so that the pulse constant and the noises due to the noises in the reset pulse are cancelled.

As seen from the above, according to the present invention, the fixed pattern noise being pecular to the solid-state camera can be removed and the drawback of the signal processing circuit of prior art that the signal-to-noise ratio of the video signal is lowered due to the noise in the reset pulse is overcome. Further, the pulse constant component included in the signal processed by the signal processing circuit of prior art can be suppressed. Still further, an economical integrated circuit system can be provided by connecting directly to the next stage amplifier without a low pass filter and simplifying all of the circuit system.

We claim:

1. A signal processing circuit for use in a solid-state camera having a solid-state image sensor for converting picture elements composing an optical image to electrical signals, the circuit comprising:
   means for sequentially sensing the electrical signals representing the picture elements output of said solid-state image sensor;
   means for converting the output signal of said sensing means into a first and a second signal which are respectively in phase with and opposite phase to the output signal of said sensing means;
   first and second integrators for integrating said first and second signals for each picture element respectively; and
   a differential amplifier for producing an output signal representing a difference between two outputs of said first and second integrators as a video signal.

2. A signal processing circuit according to claim 1, wherein said sensing means sequentially sensing the electrical signals representing the picture elements in accordance with incontinuous scanning pulses, and said first and second integrators respectively integrate said first and second signals in response to a reset pulse, which has the same frequency as said scanning pulse and a predetermined phase difference therewith, for a predetermined period associated with said reset pulse and then outputting and resetting the integrated values in response to the same reset pulse.

3. A signal processing circuit according to claim 2, wherein said converting means includes first and second transistors arranged in a differential amplifier configuration for converting the output signal of said sensing means into said first and second signals, said first integrator including a first capacitor one end of which is connected to the collector of said first transistor and a first MOS-type switching element with a controlled electrode applied with said reset pulse one end of which is connected to the collector of said first transistor and the other end thereof is connected to a DC power source through a first load, and said second integrator including a second capacitor one end of which is connected to the collector of said second transistor and a second MOS-type switching element with a controlled electrode applied with said reset pulse one end of which is connected to the collector of said second transistor and the other end thereof is connected to said DC power source through a second load, whereby the terminal voltages across said first and second loads are respectively applied to said differential amplifier as the outputs of said first and second integrators.

4. A signal processing circuit according to claim 3, wherein each of said first and second switching elements is a MOS FET.

5. A signal processing circuit according to claim 2, wherein said converting means includes first and second transistors arranged in a differential amplifier configuration for converting the output signal of said sensing means into said first and second signals, said first integrator including a first capacitor one end of which is connected to the collector of said first transistor and the other end thereof is applied with said reset pulse and further including a first bipolar-type rectifying element one end of which is connected to the collector of said first transistor and the other end thereof is connected to a first DC power source through a first load, and said second integrator including a second capacitor one end of which is connected to the collector of said second transistor and the other end thereof is applied with said reset pulse and further including a second bipolar-type rectifying element one end of which is connected to the collector of said second transistor and the other end thereof is connected to said first DC power source through a second load, whereby the terminal voltages across said first and second loads are respectively applied to said differential amplifier as the outputs of said first and second integrators.

6. A signal processing circuit according to claim 5, wherein each of said first and second rectifying elements is a diode.

7. A signal processing circuit according to claim 5, wherein each of said first and second rectifying elements is a transistor arranged so as to act as a diode.

8. A signal processing circuit according to claim 5, wherein said first rectifying element is a third transistor having an emitter connected to the collector of said first transistor, a collector connected to said first load and a base connected to a second DC power source, and said second rectifying element is a fourth transistor having an emitter connected to the collector of said second transistor, a collector connected to said second load and a base connected to said second DC power source.

* * * * *